United States Patent
Spelta et al.

(10) Patent No.: US 9,522,612 B2
(45) Date of Patent: Dec. 20, 2016

(54) SYSTEM FOR CONTROLLING THE MACHINE TORQUE OF A VEHICLE HAVING TWO DRIVE WHEELS ACTUATED BY DISTINCT MOTORS

(71) Applicant: E-NOVIA S.R.L., Milan (IT)

(72) Inventors: Cristiano Spelta, Bellusco (IT); Paolo Lisanti, Lallio (IT); Ivo Boniolo, Bovisio Masciago (IT); Sergio Matteo Savaresi, Cremona (IT); Matteo Corno, Milan (IT)

(73) Assignee: E-NOVIA S.R.L., Milan (IT)

( * ) Notice: Subject to any disclaimer, the term of this patent is extended or adjusted under 35 U.S.C. 154(b) by 0 days.

(21) Appl. No.: 14/760,717

(22) PCT Filed: Jan. 31, 2014

(86) PCT No.: PCT/IB2014/058692
§ 371 (c)(1),
(2) Date: Jul. 14, 2015

(87) PCT Pub. No.: WO2014/122562
PCT Pub. Date: Aug. 14, 2014

(65) Prior Publication Data
US 2015/0336473 A1 Nov. 26, 2015

(30) Foreign Application Priority Data
Feb. 1, 2013 (IT) .............................. MI2013A0146

(51) Int. Cl.
*B60L 15/20* (2006.01)
*B60W 30/02* (2012.01)
(Continued)

(52) U.S. Cl.
CPC ............ *B60L 15/20* (2013.01); *B60L 11/1805* (2013.01); *B60L 15/2036* (2013.01);
(Continued)

(58) Field of Classification Search
CPC ... B60L 15/20; B60L 11/1805; B60L 15/2036; B60W 50/087; B60W 50/085; Y02T 10/645; Y02T 10/72; Y02T 10/7005; Y02T 10/7275
See application file for complete search history.

(56) References Cited

U.S. PATENT DOCUMENTS 5,973,463 A * 10/1999 Okuda ................ B60L 15/2036
180/282
2004/0153228 A1* 8/2004 Matsumoto ......... B60T 8/17552
701/41

(Continued)

FOREIGN PATENT DOCUMENTS

DE 102011017464 A1 10/2012

OTHER PUBLICATIONS

PCT Search Report in PCT/IB2014/058692 dated May 30, 2014.

*Primary Examiner* — Redhwan K Mawari
*Assistant Examiner* — Rodney P King
(74) *Attorney, Agent, or Firm* — Manelli Selter PLLC; Edward J. Stemberger

(57) ABSTRACT

A system for the control of the machine torque of a vehicle (1) includes a first drive wheel (2') associated to a first motor (3') and a second drive wheel (2") associated to a second motor (3"), a steering member (4) and an accelerator member (6). The control system includes a user-interface device (13); means (7) for detecting the steering angle (δ) associated to a steering member (4); means (8) for detecting the throttle level (θ) of the accelerator member (6); means (9) for detecting the yaw rate of the vehicle ($\dot{\psi}$); means (10) for detecting the speed of the vehicle (v); and a drive module (11).

9 Claims, 5 Drawing Sheets

(51) Int. Cl.
*B60W 50/08* (2012.01)
*B60L 11/18* (2006.01)
*B60W 50/00* (2006.01)

(52) U.S. Cl.
CPC .......... *B60W 30/02* (2013.01); *B60W 50/085* (2013.01); *B60W 50/087* (2013.01); *B60L 2220/14* (2013.01); *B60L 2220/44* (2013.01); *B60L 2240/12* (2013.01); *B60L 2240/423* (2013.01); *B60L 2250/26* (2013.01); *B60W 2050/0008* (2013.01); *B60W 2050/0012* (2013.01); *B60W 2050/0064* (2013.01); *B60W 2520/10* (2013.01); *B60W 2540/10* (2013.01); *B60W 2540/18* (2013.01); *B60W 2710/083* (2013.01); *B60W 2720/14* (2013.01); *B60W 2720/406* (2013.01); *B60Y 2200/114* (2013.01); *Y02T 10/645* (2013.01); *Y02T 10/648* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 2007/0005214 A1* | 1/2007 | Villella | B60W 40/11 701/70 |
| 2009/0131215 A1* | 5/2009 | Shamoto | B60K 6/365 477/3 |
| 2009/0272592 A1* | 11/2009 | Gaffney | B60T 8/1755 180/197 |
| 2010/0025131 A1* | 2/2010 | Gloceri | B60G 3/20 180/65.28 |
| 2011/0166729 A1* | 7/2011 | Tabatowski-Bush | B60W 10/26 701/22 |
| 2011/0307129 A1 | 12/2011 | Yu et al. | |
| 2012/0303200 A1* | 11/2012 | Ang | B60K 6/445 701/22 |
| 2014/0067181 A1* | 3/2014 | Kato | B60T 8/175 701/22 |

* cited by examiner

SYSTEM FOR CONTROLLING THE MACHINE TORQUE OF A VEHICLE HAVING TWO DRIVE WHEELS ACTUATED BY DISTINCT MOTORS

TECHNICAL FIELD OF THE INVENTION

The object of the present invention is a system for controlling the machine torque of a vehicle having two drive wheels, each driven by a dedicated motor. The present invention may find application in particular in the field of electric karts.

PRIOR ART

Numerous systems are known for the control of vehicle dynamics, under different points of view. Examples of such systems are the wheel locking control during braking, the drive-wheel slip control, the stability control.

The control systems listed above have as their main task to alter the natural dynamic behavior of the vehicle in the direction of greater security or better performance, by modulating the output of the driving torque, the action of the braking torque or the response of the suspensions.

In known control systems the possibilities of intervention by the user are, however, limited. Although it is generally possible to modify some parameters, it impossible to radically modify the overall action of the system on the vehicle following the user's needs. For example, stability control systems can't be modified by the user in order to worsen the lateral dynamics of the vehicle, which might be advantageous, for example, in vehicles used for training.

SUMMARY OF THE INVENTION

The object of the present invention is to provide a control system of the driving torque of a vehicle which allows to alter the dynamics of the same depending on the user's needs, for example in order to improve the lateral dynamics for a better security or to create asymmetries in the behavior of the vehicle or even a worsening of its natural dynamics for training purposes.

This and other objects are achieved by a control system of the machine torque of a vehicle according to claim 1.

BRIEF DESCRIPTION OF THE FIGURES

To better understand the invention and appreciate its advantages, some of its illustrative non-limiting embodiments will be described below, with reference to the attached figures, wherein.

DETAILED DESCRIPTION OF THE INVENTION

Figure 1:
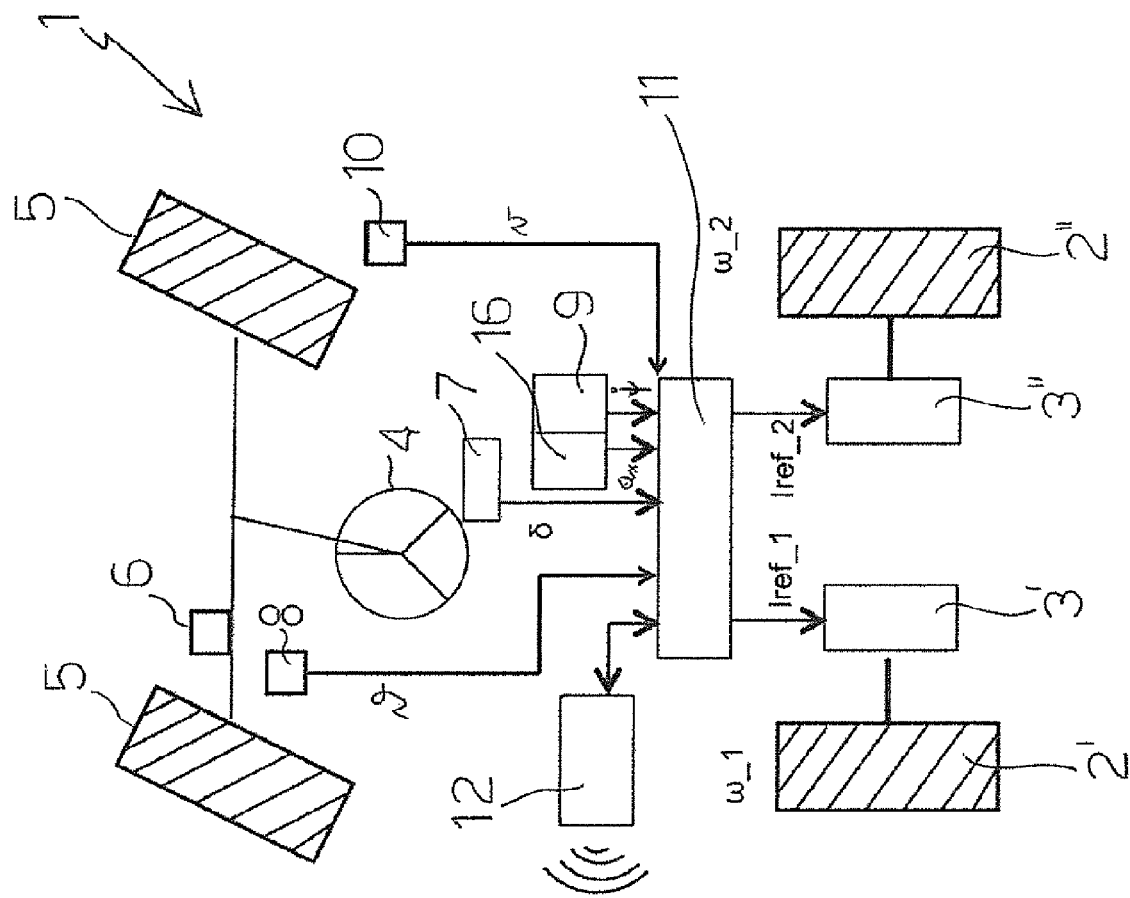
FIG. 1 is a schematic view of a vehicle equipped with a control system according to the invention.
Figure 1:
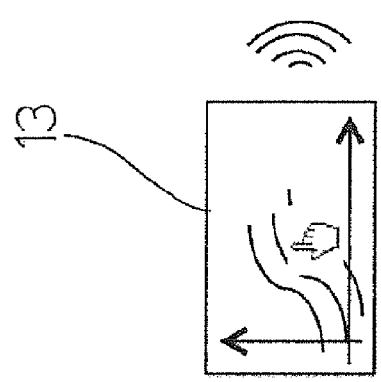

Referring to FIG. 1, a vehicle is schematically indicated by reference 1. The vehicle 1 comprises a first drive wheel 2' and a second drive wheel 2", respectively associated to a first motor 3' and to a second motor 3". The two drive wheels 2' and 2" can be independently actuated. In the example of FIG. 1, the drive wheels 2' and 2" are in the rear position, but they can be alternatively in the front position of the vehicle. The motors and the drive wheels can be directly connected or, as an alternative, members with variable gear ratios (not shown), such as gear boxes, can be interposed between the motors and the respective drive wheels. Motors 2' and 2" are preferably electric motors, e.g. DC, brushless or asynchronous motors. The rotation speeds of drive wheels 2' and 2" are shown in FIG. 1 respectively as $\omega\_1$ and $\omega\_2$.

The vehicle 1 comprises a steering member 4 which can be actuated by a user to control the steering of the vehicle, in particular the steering angle $\delta$ of the directional wheels 5. The steering member 4 may comprise, for example, a steering wheel, as shown in FIG. 1, or may alternatively include different sorts of devices, such as a handlebar. The steering member 4 is associated to and controls the steering of one or more directional wheels 5. According to the example illustrated, the directional wheels 5 are equal in number to two and are not drive wheels. Of course, there may be a different number of directional wheels, which may also be alternatively drive wheels.

The vehicle 1 further comprises an accelerator member 6 through which the user can adjust the speed/acceleration of the vehicle by changing the throttle level $\theta$. For example, the accelerator member 6 may include a gas pedal, with a throttle level corresponding to the pedal travel, depending on the speed/acceleration imposed on the vehicle by the user.

According to a possible embodiment, the vehicle 1 is an electric kart, wherein engines 3' and 3" are electric motors. Of course the vehicle 1 may also be of a different kind, e.g. a car, a quad or a generic vehicle with two drive wheels.

The vehicle 1 is equipped with a system for the control of the torques of its first 3' and second 3" motors.

The control system comprises means 7 for detecting the steering angle $\delta$ of the steering member 4. For example, said means 7 may comprise a potentiometer, a LVDT (linear variable displacement transducer) or a Hall effect sensor. The means 7 are suitable to generate a signal, in particular an electric signal, representing the steering angle.

The control system also comprises means 8 for detecting the throttle level $\theta$ of the accelerator member 6, e.g. of the gas pedal travel. For example, such means 8 may comprise a potentiometer, an LVDT transducer or a Hall effect sensor. The means 8 are suitable to generate a signal, in particular an electric signal, representing the throttle level $\theta$ of the accelerator member 6.

The control system further comprises means 9 for detecting the yaw rate $\dot{\psi}$ of the vehicle 1. For example, such means 9 may comprise a gyroscope, an inertial measurement unit or similar devices capable of measuring accelerations from which it's possible to obtain speed values. The means 9 are suitable to generate a signal, in particular an electric signal, representative of the yaw rate $\dot{\psi}$ of the vehicle.

The system further comprises means 10 for detecting the speed v of the vehicle 1. For example, said means 10 may comprise speed sensors such as encoders, resolvers or similar devices, associated with the vehicle wheels, preferably with the non-driving wheels. In the example shown in FIG. 1, said means 10 for detecting speed v can be associated with the directional wheels 5. Starting from the rotation speed of the wheels, it is possible to determine the linear speed of the vehicle. The means 10 are suitable to generate a signal, in particular an electric signal, representative of the speed of the vehicle v.

In accordance with a possible embodiment, the system additionally comprises means 16 to detect the acceleration ax of the vehicle and such means are suitable to generate a signal representing the vehicle acceleration. For example, said means 16 may include accelerometers or an inertial measurement unit and the latter can be the same one used for detecting the yaw rate of the vehicle.

The system further comprises a drive module 11 suitable to receive input signals representing the steering angle $\delta$, the accelerator member throttle $\theta$, the speed v, the yaw rate $\dot{\psi}$ and possibly the acceleration ax of the vehicle and suitable to provide an output reference drive signal for the first motor l_ref1 and a reference drive signal for the second motor l_ref2. The reference drive signals l_ref1 and l_ref2, preferably electric current signals, are representative of (i.e. related to) the driving torque to be delivered respectively by the first 3' and the second 3" motor. With reference for example to DC motors, the machine torque depends on the current supply and is also related to the rotation speed of the motor. The acceleration and the speed of the vehicle depend on the torque and on the speed of the motors. Preferably, the first 3' and the second 3" motors comprise respective motor controllers (not shown in the figures) which carry out a closed-loop current control of the reference drive signals of the first (l_ref1) and second (l_ref2) motors—and therefore of the machine torques of the same—in known ways, which therefore will not be described.

According to a possible embodiment, the control system also includes a communication module 12 connected to the drive module 11 and to a user-interface device 13, that can communicate wirelessly (for example, via Bluetooth protocol or via other wireless protocols) with the communication module 12 and through it with the drive module 11. Through the user-interface device 13, the user can act on the control system and thus set the parameters that influence the dynamic behavior of the vehicle, as explained below. For example, the user-interface device 13 may comprise a personal computer, a smartphone or a tablet. Alternatively, the user-interface device 13 may be connected, in a permanent or separable manner, through wires, to the drive module 11.

Figure 2:
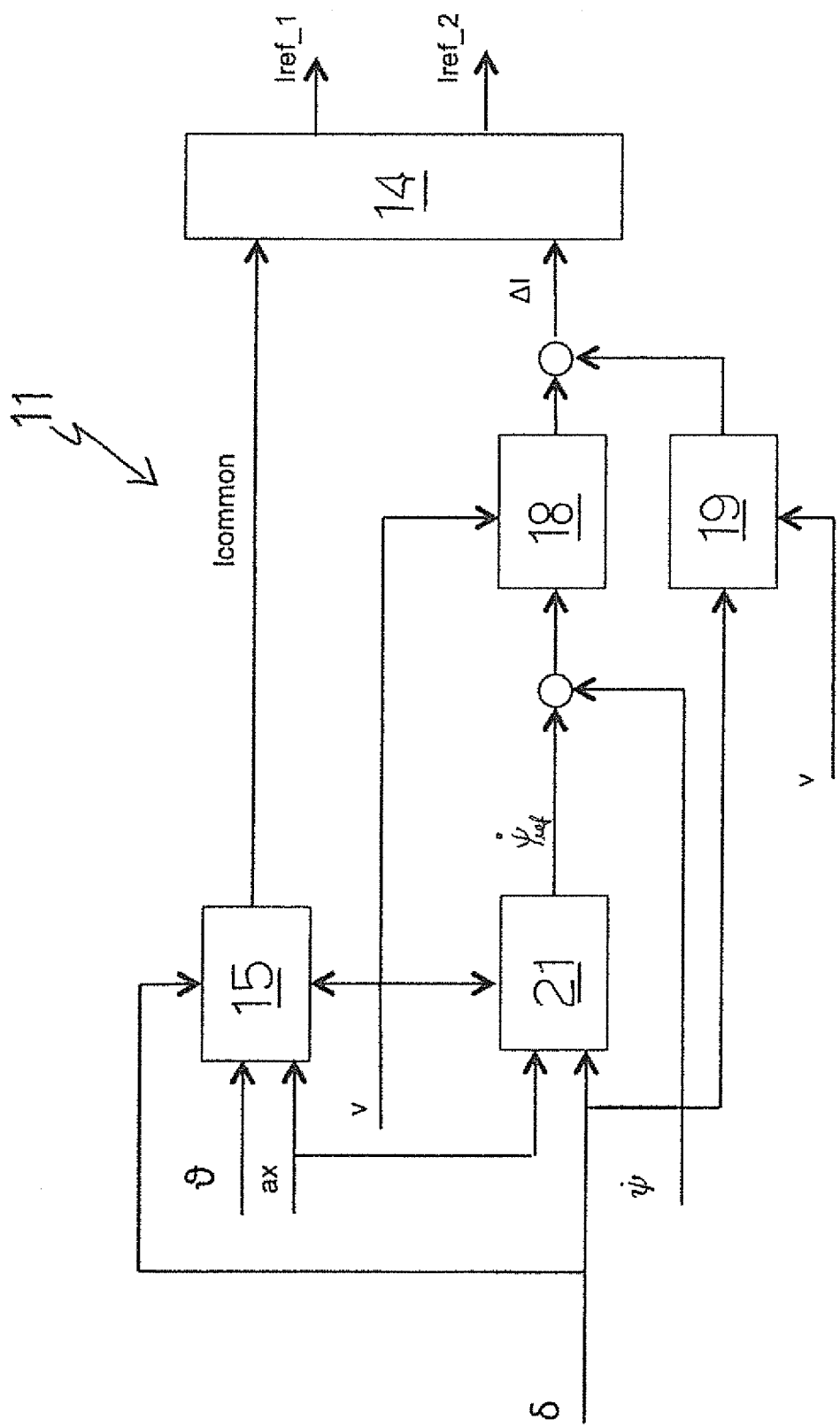
FIG. 2 is a block diagram of the control system in accordance with a possible embodiment.

Referring now to FIG. 2, it shows a block diagram which represents the control system.

The reference drive signals of the first l_ref1 and of the second l_ref2 motors are determined from a common reference drive signal lcommon representing a reference common torque (i.e. equally distributed) to the first 3' and the second 3" motors and from a differential reference drive signal $\Delta l$ representing a reference torque difference between the first 3' and the second 3" motors. The provision of the differential reference drive signal $\Delta l$ causes the drive torque of the first 3' and the second 3" motor to be mutually differentiable in a controlled manner, in such a way that it is possible to impose on the vehicle desired lateral dynamics, different from the natural ones that the vehicle would have in case of a drive torque equally distributed on the two drive wheels.

For example, the reference drive signals of the first l_ref1 and of the second l_ref2 motor can be calculated from an allocation module of the torque 14 of the drive module 9 in the following manner:

$$l\_ref1 = lcommon + \Delta l/2$$

$$l\_ref2 = lcommon - \Delta l/2$$

It will now be described how the common reference drive signals (lcommon) and the differential ones $\Delta l$ are determined from which following the aforesaid proceeding it's possible to obtain the reference drive signals for the first l_ref1 and for the second l_ref2 motors.

Figure 6:
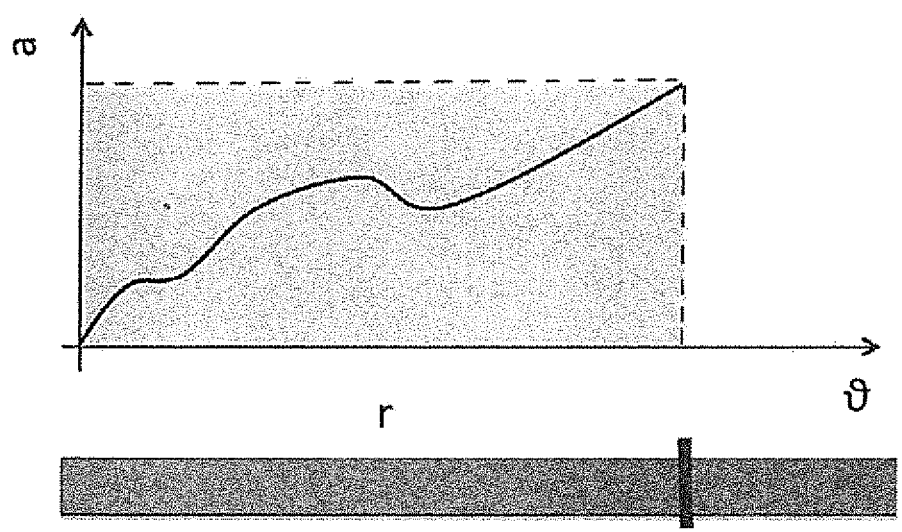

With regards to the common reference drive signal lcommon, the drive module 11 comprises a module 15 for determining the latter at least on the basis of the signal representing the throttle $\theta$ of the accelerator member. In this way, for example, a value of the common reference drive signal lcommon and thus an acceleration of the vehicle correspond to a particular accelerator travel position. The relation between the throttle level $\theta$ of the accelerator member and the value of the common reference drive signal lcommon, as determined by said module 15, is preferably modifiable by the user for example through the interface-device 13. In FIG. 6 a possible screen of this device is given as an example: it shows a diagram with the throttle level $\theta$ of the accelerator member in abscissa and the vehicle acceleration a in ordinate. Within the shaded region shown in the diagram, the user can modify the curve representing this relation to his liking. For example, if the user interface-device 13 is touchscreen, the user can manually act on the curve, modifying it. The pairs a-$\theta$ with values corresponding to points of the shaded region are stored in a memory module (not shown in the figures), for example in the form of a default look-up table, whose discrete values can be interpolated in such a way that a continuous relation between the vehicle acceleration and the throttle level $\theta$ of the accelerator member is obtained.

Figure 7:
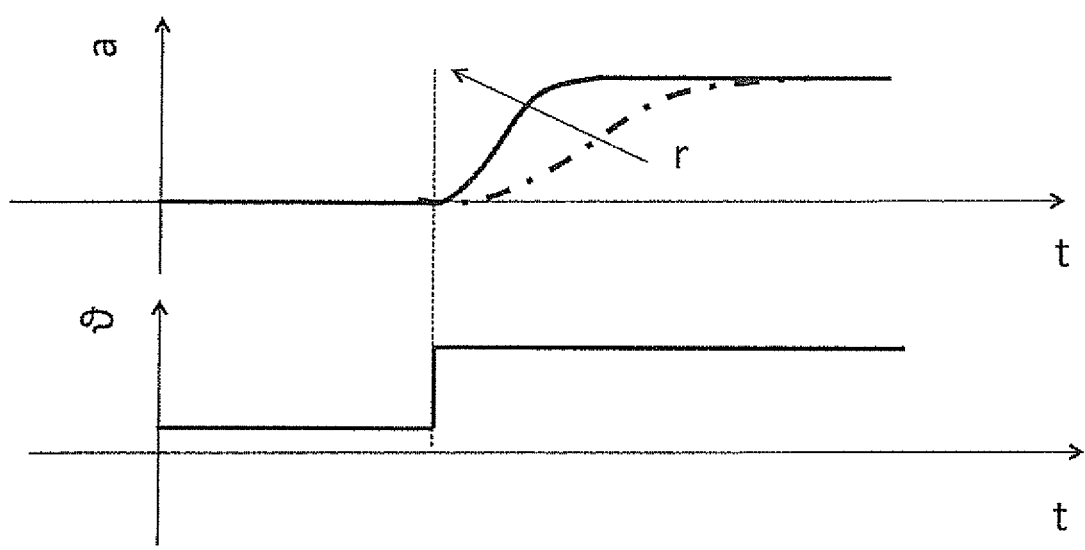
FIG. 7 shows a diagram which illustrates the different response of a vehicle, equipped with a control system made according to the invention, when varying a reactivity index which can be actuated by the user.

It is to be note that the curve depicted in FIG. 6 is static, i.e. a curve that describes the trend of the acceleration at steady-state. Preferably the user can act on a control representing the reactivity index r of the system (shown in FIG. 6 as a slider movable along a bar), which alters the reactiveness of the system, i.e. that acts on the speed of response of the same. The effect of the change of the reactivity index is shown in FIG. 7, where the trend of the vehicle acceleration a in time t is shown as a function of the throttle level $\theta$ of the accelerator member on varying the reactivity index r. It can be seen that, in response to an instantaneous change of the throttle $\theta$ of the accelerator member (lower diagram in FIG. 7) the vehicle reaches faster the steady-state acceleration a for high values of the reactivity index r (upper diagram in FIG. 7).

Preferably, the module 15 for determining the common reference drive signal lcommon is configured in such a way as to determine the common reference drive signal (lcommon) also on the basis of the signal representing the steering angle $\delta$ and/or of the signal representing the vehicle speed v, preferably on the basis of both. In this way, the common torque of the two motors is determined on the basis of three vehicle parameters, namely the throttle level $\theta$ of the accelerator member, the steering angle $\delta$ and the speed of the vehicle v. Even the relation between the acceleration a and respectively the steering angle and the speed of the vehicle can be stored in a memory module and can be modified by the user in a manner similar to that described with reference to the relation between the acceleration of the vehicle.

Figure 5:
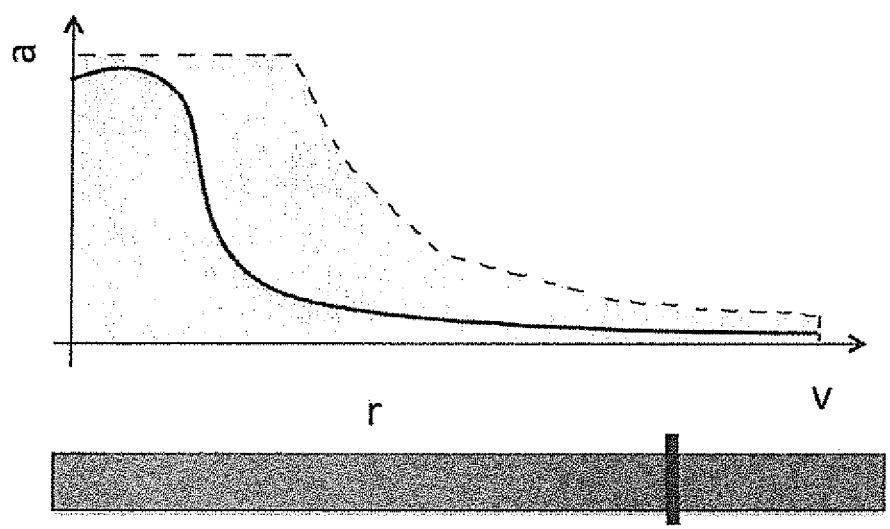

For example, in FIG. 5 a diagram illustrates a possible relation between the vehicle acceleration a) and the vehicle speed v, as it can be shown to the user by the user-interface device 13. Even in this case, the shaded region represents the operative limits of the system and the curve shown can be changed by the users depending on their needs. According to the represented illustrative curve, the acceleration a of the vehicle is limited to high speeds. Moreover, even in this case, the user can act on the index of reactivity r to modify the response of the system, as previously explained.

A similar curve, not shown in the figures, is obtainable for the relation between the vehicle acceleration a and the steering angle δ of the steering member. Even in this case, the user can act on the curve, modifying it within certain predefined values, to alter the common torque of the motors in function of the steering angle. For example, one can limit the common torque during a turn, when the steering angle reaches high values.

According to a preferred embodiment of the invention, the module 15 is configured so as to determine the common reference drive signal lcommon and therefore the common torque of the motors 3' and 3", on the basis of a predetermined relation, editable by the user, between the acceleration of the vehicle a (related to the machine torque), the steering angle δ, the vehicle speed v and the throttle level θ of the accelerator member. In other words, in the system it is stored a four-dimensional relation between the acceleration (desired), the steering angle, the vehicle speed and the throttle level of the accelerator member. This relation can be modified by the user acting on single two-dimensional curves, such as the acceleration-throttle level of the accelerator member curve, following to the aforesaid methods. Acting on the index of reactivity r, the user can determine the reaction speed of the system, according to what previously stated. In function of this four-dimensional relation, the module 15 determines the acceleration of the vehicle and therefore the common reference drive signal lcommon. In other words, the module 15 acts as a module setting the acceleration profile, which determines the common reference drive signal lcommon on the basis of the signals representing the throttle level of the accelerator member, the speed of the vehicle and the steering angle.

In accordance with a possible embodiment, the module 15 for determining the common reference drive signal is configured in such a way as to maintain the common reference drive signal lcommon within a range bounded by a maximum value lmax (positive, corresponding to a common positive torque, which causes an acceleration of the vehicle) and a minimum value (min (negative, corresponding to a common positive torque, which causes deceleration of the vehicle). In this way we prevent that the value of the common reference drive signal (lcommon) is such that a torque is imposed on the motors higher than the maximum they are capable of distributing in said specific operating conditions (e.g. at a certain rotation speed of the motors). For example, it is possible to impose predetermined reference values of the maximum value (max and of the minimum value (min of the common reference drive signal, possibly variable on the basis of the current conditions of the vehicle. Alternatively, as previously mentioned, the module 15 for determining the common reference drive signal can be configured to receive also an input signal representing the acceleration ax, provided by the means 15 for detecting the vehicle acceleration, and to control the common reference drive signal lcommon also in function of this signal representing the acceleration ax. In particular, the maximum value (positive) and the minimum value (negative) of the acceleration and thus also the reference drive signal lmax and lmin—determined as previously stated as a function of the throttle level θ of the accelerator member, of the speed of the vehicle v and of the steering angle δ—can be limited on the basis of the actual detected acceleration ax of the vehicle. As a matter of fact the detection of the acceleration ax allows to determine the actual power supplied by the motors in given operative conditions. Therefore the module for determining the acceleration profile 15 may limit the value of the common reference drive signal lcommon in such a way that the motors are not requested a machine torque causing a power delivery higher than that actually supplied in those particular operating conditions of the vehicle.

With reference now to the differential reference drive signal Δl, the drive module 11 comprises a module 21 for determining a reference yaw rate $\dot\psi$ ref based at least on the signals representing the steering angle δ and the speed v of the vehicle. The reference yaw rate $\dot\psi$ ref is determined by the module 21 according to a predetermined relation between the indicated quantities. This relation is preferably set by the user, for example through the user-interface device 13.

Figure 3:
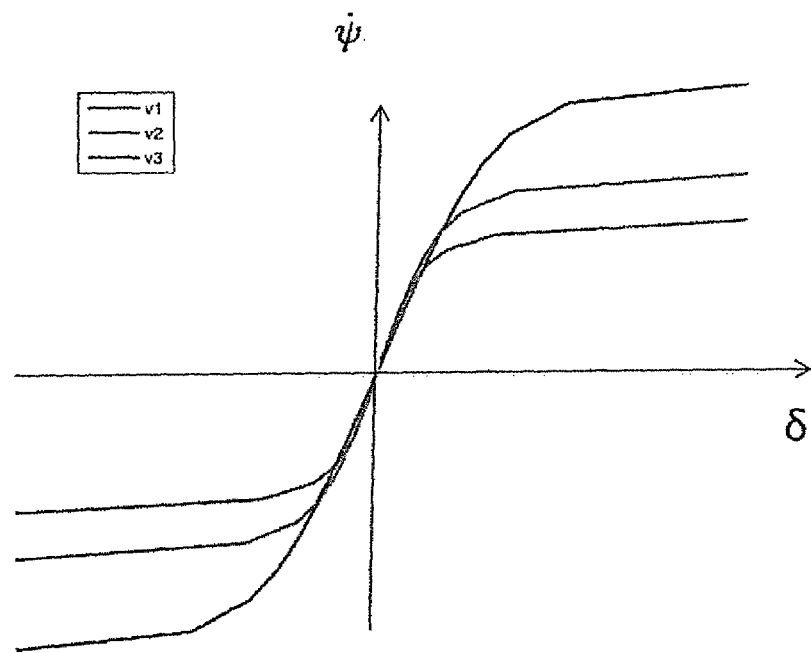
FIG. 3 is a diagram illustrating the theoretical trend of the yaw rate of a vehicle as a function of the steering angle and of speed.
Figure 4:
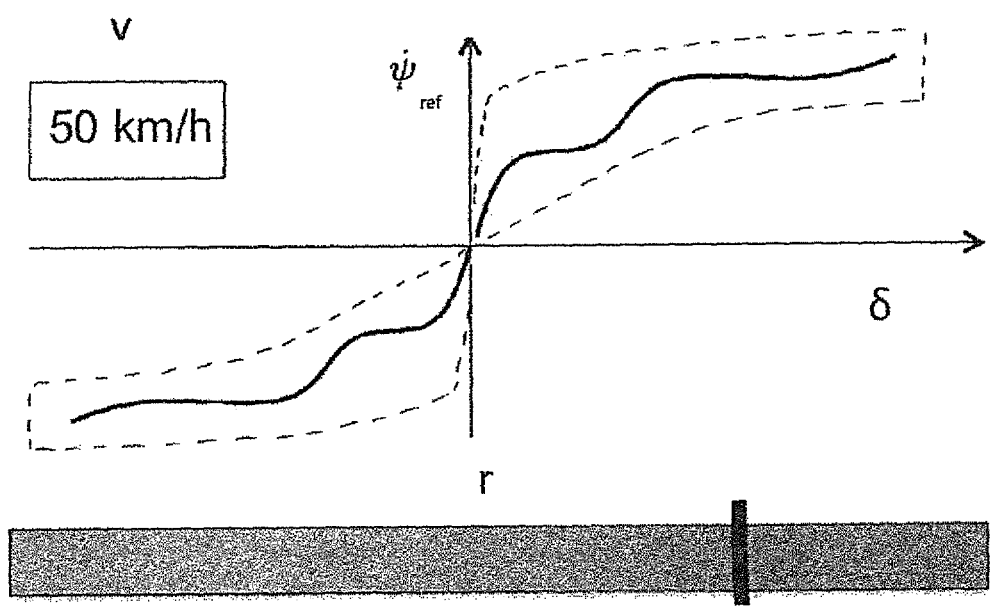
FIGS. 4, 5 and 6 show possible screens of a user-interface device of the control system.

It is known that the theoretical relation between the yaw rate $\dot\psi$, the steering angle δ and the vehicle speed v can be qualitatively described by a curve of the type shown in FIG. 3, where the relation between the yaw rate $\dot\psi$ and the steering angle 6 is shown for three different speeds. This type of known relation can be exploited to determine the reference yaw rate $\dot\psi$ ref previously cited. FIG. 4 shows a possible screen of user-interface device 13, in which a diagram appears wherein for a specific vehicle speed (in the example equal to 50 Km/h), the relation between the reference yaw rate $\dot\psi$ ref and the steering angle δ is represented. The shaded region shows the limits for the setting of the reference yaw rate $\dot\psi$ ref and its boundaries correspond to those defined by the previously described theoretical curves shown in FIG. 3. The user may then act by changing the curve that links the reference yaw rate $\dot\psi$ ref to the steering angle δ. Said operation can be repeated for different speeds v. Even in this case, the relation between the reference yaw rate $\dot\psi$ ref, the steering angle δ and the vehicle speed v can be stored in the form of look-up table in a memory module. It's also possible to obtain a continuous relation by interpolation of discrete data of the look-up table.

The reference yaw rate ($\dot\psi$ ref) represents the theoretical yaw speed that the user may impose on the vehicle acting in the above-mentioned ways on the control system.

According to a possible embodiment, the reference yaw rate ($\dot\psi$ ref) can be changed on the basis of the detected acceleration ax of the vehicle. In particular, as previously explained, depending on the acceleration ax, it's possible to determine the power necessary to the motors for the acceleration of the vehicle in the given conditions and therefore to discover the residual power available for controlling the lateral dynamics. For example if, on the basis of the current vehicle acceleration ax, it is clear that all the power of the motors is already used by the common reference torque, it is no longer possible to use additional power to control the lateral dynamics. Therefore the module 21 does not generate the reference yaw speed that would be normally determined in those given conditions, since the necessary power of the motors is not provided.

The drive module 11 comprises a module 18 for determining the differential reference drive signal Δl on the basis of at least the representative signal of the yaw rate $\dot\psi$, detected for example by the detecting means 9 during the operation of the vehicle, and of the reference yaw rate $\dot\psi$ ref, determined as explained by the module 21 for the determination of the reference speed.

In particular, advantageously, the module 18 for determining the differential reference drive signal Δl is configured in such a way as to determine the latter, performing a closed-loop control of the error between the actual yaw rate of the vehicle $\dot\psi$ and the reference yaw rate $\dot\psi$ ref. The closed-loop control has as its purpose to minimize this error, namely to ensure that the actual yaw rate tends to be equal to the reference yaw rate.

In this way, the differential reference drive signal Δl is such that the motor torques tend to confer on the vehicle the desired yaw rate, i.e. the reference yaw rate $\dot{\psi}$ ref. For example, the closed loop-control of the yaw rate can be actuated with a PID controller or with a different kind of controller, for example fuzzy logic.

According to a possible embodiment, the module 18 for determining the differential reference drive signal Δl is configured in such a way that the parameters of the closed-loop control can be modified according to the representative signal of the vehicle speed v. For example, with reference to a PID controller, it is possible to change the proportional constants, derivative and integrative, as a function of the speed of the vehicle. In this way a substantially uniform response of the vehicle at different speeds is granted. To determine the relation between the parameters of the controller and the speed of the vehicle, gain scheduling criteria can be used (per se known and therefore not described here).

According to a possible embodiment, the drive module 11 comprises both a feed-forward control module 19 configured so as to modify the differential reference drive signal Δl based on the signal representing the steering angle δ. In particular, the feed-forward control module 19 acts as a dynamic filter having an input signal representative of the steering angle δ. Preferably, even the control parameters of the feed-forward control module 19 can be modified, according to a gain scheduling logic, on the basis of the signal representing the vehicle speed v. In the presence of the feed-forward control module 19, the differential reference drive signal Δl can be obtained as the algebraic sum of the output signals from the closed-loop control module 18 and from the feed-forward control module 19.

The common reference drive signals lcommon and differential reference drive signals Δl, determined as discussed above, are then distributed by the allocation module of the torque 14, as previously stated, between the two motors, in the form of reference drive current of the first motor lref_1 and of reference drive current of the second motor lref_2.

Note that, in the present description and in the appended claims, the control system as well as the elements indicated with the term "module" may be implemented using hardware devices (e.g. control units), software or a combination of hardware and software.

From the above description the skilled person will appreciate how the control system of the machine torque according to the invention allows a customization of the dynamics of a vehicle depending on the user's needs. The control system is able to act on the common torque of the two drive wheels, so that the motors accelerate in a customized way depending on the current conditions of the vehicle, and also to impose a torque difference between the motors and therefore the drive wheels, so as to impose on the vehicle a lateral dynamic behavior which is customizable too. Therefore the system in accordance with the invention can be used to improve the performance of the vehicle under particular circumstances (for example in order to ensure a different response in a kart or in a sporty vehicle in left and right turns on tracks with a prevalence of turns in a particular direction). The system in accordance with the invention may also be usefully exploited in training, e.g. imposing on the vehicle a dynamic behavior that simulates difficult driving conditions, such as different grip conditions on the two drive wheels.

The skilled person, in order to satisfy contingent specific requirements, may apply—to the embodiments described—numerous additions, modifications or replacements of elements with others functionally equivalent, without however departing from the scope of the accompanying claims.

The invention claimed is:

1. A system for controlling the machine torque of a vehicle comprising a first drive wheel associated to a first motor and a second drive wheel associated to a second motor, a steering member and an accelerator member, which can be actuated by a vehicle user, said control system comprising:
   a user-interface device for the control of the system by the user;
   means for detecting the steering angle associated to the steering member suitable to generate a signal representing the steering angle;
   means for detecting the throttle level of the accelerator member suitable to generate a signal representing the throttle level of the accelerator member;
   means for detecting the yaw rate of the vehicle $\dot{\psi}$ suitable to generate a signal representing the yaw rate of the vehicle;
   means for detecting the speed of the vehicle suitable to generate a signal representing the speed of the vehicle; and
   a drive module comprising:
      a module for determining a common reference drive signal representing a reference torque which is common between the first and the second motors on the basis of at least said signal representing the throttle level of the accelerator member;
      a module for determining a reference yaw rate $\dot{\psi}$ on the basis of at least the signals representing the steering angle and the speed of the vehicle according to a predetermined relation which can be defined by the user through the user-interface-device by changing a theoretical relation between the yaw rate, the steering angle and the speed of the vehicle; and
      a module for determining a differential reference drive signal representing a reference torque difference between the first and the second motors on the basis of at least the signal representing the yaw rate of the vehicle $\dot{\psi}$ and the reference yaw rate $\dot{\psi}$;
   wherein the drive module is configured to provide a reference drive signal for the first motor and a reference drive signal for the second motor representative of the driving torque to be delivered respectively by the first and the second motors, wherein the reference drive signals of the first and of the second motors are determined from the common reference drive signal and from the differential reference drive signal.

2. A system according to claim 1, wherein said module for determining the differential reference drive signal is configured so to determine said differential reference drive signal by operating a closed-loop control of the error between the yaw rate of the vehicle $\dot{\psi}$, determined from the signal representing the yaw rate of the vehicle, and the reference yaw rate $\dot{\psi}$.

3. A system according to claim 2, wherein said module for determining the differential reference drive signal is configured so to modify parameters of said closed-loop control on the basis of the signal representing the speed of the vehicle.

4. A system according to claim 1, wherein said drive module further comprises a feed-forward control module configured so to modify the differential reference drive signal on the basis of the signal representing the steering angle.

5. A system according to claim 1, wherein said module for determining the common reference drive signal is configured so to determine said common reference drive signal further on the basis of the signal representing the steering angle of the vehicle.

6. A system according to claim 1, wherein said module for determining the common reference drive signal is configured so to determine said common reference drive signal on the basis of a predetermined relation which can be modified by the user between the desired acceleration of the vehicle, the steering angle, the speed of the vehicle and the throttle level of the accelerator member.

7. A system according to claim 1, wherein said user-interface device is of the wireless type for the remote control of the control system by the user, and the system comprises a communication module suitable to put in communication the drive module and the user-interface device.

8. A system according to claim 1, wherein said drive module is configured so to limit the value of the common reference drive signal (Icommon) and/or of the differential reference drive signal on the basis of the maximum power which can be exerted by the first and the second motors during the use of the vehicle.

9. A vehicle comprising a control system according to claim 1.

* * * * *